United States Patent

Lundgren et al.

[11] 4,073,547
[45] Feb. 14, 1978

[54] BALL BUSHING FOR LINEAR MOTIONS

[75] Inventors: Bengt Lundgren, Ulricehamn; Sven Walter Nilsson, Partille, both of Sweden

[73] Assignee: SKF Nova AB, Goteborg, Sweden

[21] Appl. No.: 753,080

[22] Filed: Dec. 21, 1976

Related U.S. Application Data

[63] Continuation of Ser. No. 638,634, Dec. 8, 1975, abandoned.

[30] Foreign Application Priority Data

Jan. 22, 1975 Sweden .............................. 7500654

[51] Int. Cl.² ............................................. F16C 27/00
[52] U.S. Cl. ................................. 308/6 C; 308/28; 308/184 R; 308/237 R
[58] Field of Search ................. 308/6 C, 188, 189 R, 308/193, 192, 237

[56] References Cited

U.S. PATENT DOCUMENTS

| | | | |
|---|---|---|---|
| 3,844,629 | 10/1974 | Haines | 308/6 C |
| 3,891,284 | 6/1975 | Ernst | 308/6 C |
| 3,900,233 | 8/1975 | Thomson | 308/6 C |
| 3,951,473 | 4/1976 | Olschewski | 308/6 C |
| 4,005,913 | 2/1977 | Thomson, Jr. | 308/6 C |

Primary Examiner—Richard A. Bertsch
Attorney, Agent, or Firm—Eugene E. Renz, Jr.

[57] ABSTRACT

A ball bushing for linear motions comprising a circumferentially extending cage member disposed between an outer sleeve and a shaft or the like. The outer sleeve is characterized by a novel structural arrangement providing ease in mounting. The outer sleeve is a self-contained unit which is easy to handle and suitable for mounting in housings in a manner allowing prestressing of the bushing. The cage has a plurality of circumferentially spaced axially oriented grooves which define closed paths for the rolling elements and includes at least one path in which the folling elements are loaded. The cage also has at one axial end a projection defining an abutment shoulder for the sleeve. The sleeve comprises a plurality of longitudinal sections of a predetermined length to overlie the grooves in the cage. Adjacent the sections have complementary grooves and ridges formed therein permitting assembly by relative axial displacement to form a closed sleeve encircling the cage. Detachable retaining means is provided adjacent the opposite end of the cage for positioning the sleeve in the cage and limiting axial displacement thereof. Another feature in one embodiment is the provision of a radial projection which is detachable.

8 Claims, 2 Drawing Figures

BALL BUSHING FOR LINEAR MOTIONS

This application is a continuation of my prior application Ser. No. 638,634 entitled BALL BUSHING for linear motions filed Dec. 8, 1975, now abandoned.

BACKGROUND OF THE INVENTION

The present invention relates to a ball bushing for linear motions, comprising a number of closed loops for rolling bodies between an outer sleeve and a shaft or the like, the rolling bodies being loaded in at least one part of the loop.

In such a ball bushing the rolling bodies are loaded between the outer sleeve and the shaft, and thereby it is common practice to provide the loaded parts of the shaft and/or the sleeve with special raceways of a wear-resistant material. Further, the bushing is generally provided with a cage element situated between the shaft and the sleeve, which element is provided with closed ball paths for guiding the balls. As an example of such a bushing, reference can be made to the Swedish patent publication, No. 361,342. In this publication, a ball bushing is described comprising a closed outer sleeve and a cage element adapted inside it, the cage element comprising a number of closed ball paths and surrounding a shaft. The loaded balls are not contacting the sleeve directly, but roll against a metal bar, which is supported by the inner surface of the sleeve. The metal bar is kept in position by parts of the cage element. The outer sleeve is designed so that a certain deformation of it is possible by changing the bore diameter in a housing surrounding the sleeve. Thereby it is possible to pre-stress the bushing as desired, and, moreover, the pre-stressing can be adjusted.

A bushing of the type described above has, however, certain drawbacks. For example, the shape of the outer sleeve is rather complicated, which makes the production cost high. Tests have been carried out to produce it by extrusion. Aluminum has been used, because this material requires comparatively low press forces, which makes the tools cheap, and because the pre-stressing of the completed bushing is easy to carry out. However, it has been shown, that also this method is expensive, and furthermore, by the motion of the balls, a quick wear of those parts of the sleeve which define the unloaded parts of the ball paths takes place. It is also known to design the outer sleeve as a unit in a polymer material, see for example, the German Offenlegungsschrift No. 2,402,401. The loaded parts of the sleeve are hereby made of metal bars, which are mounted by being pressed radially inwards in axially extending slots in the sleeve. Also, such sleeves have a comparatively complicated shape, because they, in principle, consist of a hollow cylinder with a very special shape of the bore, in which axially extending slots are provided. The rims of the slots have thereby a special shape in order to make it possible to fit the metal bars. The production of such sleeves is therefore complicated.

SUMMARY OF THE INVENTION

With a device according to the present invention, the characterizing features of which appear in the accompanying claims, the above mentioned drawbacks are avoided, i.e., a ballbushing is achieved, the outer sleeve of which can be made and mounted in a simple and cheap way at the same time as it is a closed, self-contained unit which is easy to handle and very suitable for mounting in such housings which allow pre-stressing of the bushing.

BRIEF DESCRIPTION OF THE DRAWINGS

The invention will now be described in detail with reference to the accompanying drawing, in which.

DETAILED DESCRIPTION OF THE PREFERRED EMBODIMENT

Figure 1:
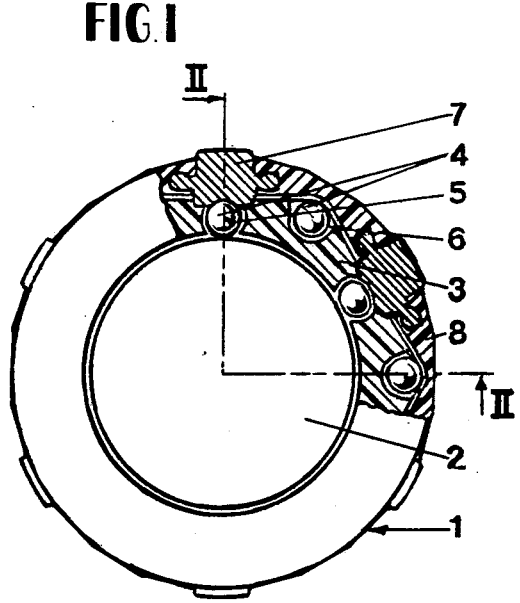
FIG. 1 shows a cross section according to Section I—I in FIG. 2.
Figure 2:
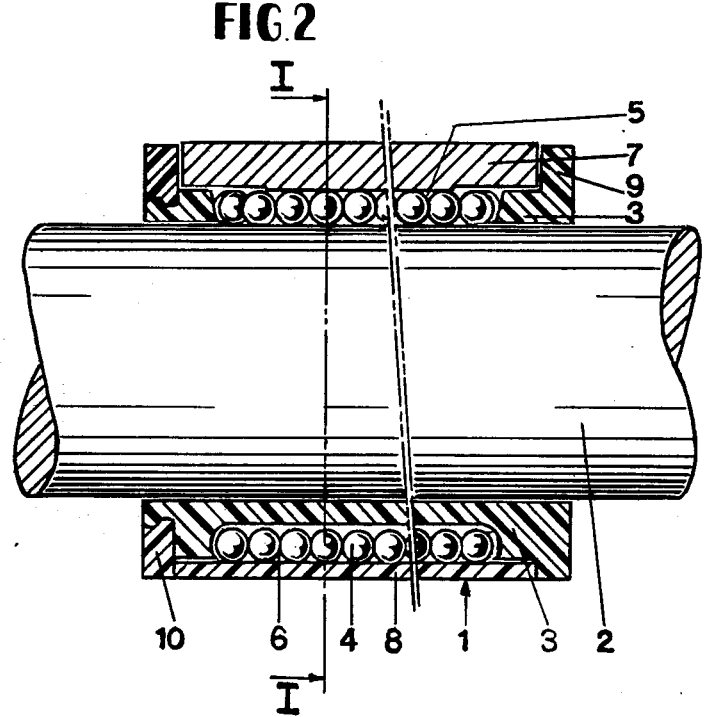
FIG. 2 shows an axial section according to Section II—II of FIG. 1 of one embodiment of the invention.

The bushing 1 is surrounding and is axially displaceable on a shaft 2. A cage element 3 in the bushing is surrounding the shaft 2. In the cage element a number of closed ball paths are provided, which paths are filled with balls. In a part 5 of these paths balls are loaded, and in another part 6 they are unloaded. The cage elements with the ball paths are surrounded by an outer sleeve, which is the part of the bushing which is most essential for the invention. This sleeve comprises a number of longitudinal sections 7, 8, which constitute alternatingly loaded and unloaded portions of said sleeve. The sections 7 are thereby the loaded portions and are distributed around the sleeve at a number corresponding to the number of closed ball paths. They are provided with race grooves for the loaded balls which, at the same time as they contact the sections 7, also contact the shaft 2 or possibly special raceways provided on the shaft. In order to achieve the desired strength, the sections 7 are suitably made of steel. Between each section 7 another section 8 is provided. These sections comprise portions which guide the balls in the unloaded parts of the ball paths. By the existence of these portions, the sections 8 have a cross section, the central part of which is comparatively thin and thereby resilient, so that the bushing can be pre-stressed in a housing with variable bore diameter. If the sections 8 are made of a polymer material, for example, polyamide, desirable deformation properties are achieved, and the wear by the balls against the inner surfaces of the sections is insignificant.

The sections 7 and 8 are kept together to a closed sleeve by being provided along their sides with grooves (sections 8) and ridges (sections 7), which are arranged so that a ridge on a section 7 is fitted into a groove in an adjacent section 8. Alternatively, the sections 7 can be provided with grooves, and sections 8 can be provided with ridges, and it is also possible that every section shows one groove and one ridge. By providing the grooves and the ridges according to the FIGURE, however, the sections 7 are automatically provided with stiffening "flanges," which is preferable in order to achieve the desired linearity.

The grooves and the ridges are so designed that the sections can be put together and separated by relative axial displacement. In order to keep the sections 7, 8 in a desired position axially, the end portions of the bushing are provided with flanges 9, 10 radially extending from the cage element 3, which flanges limit the axial mobility of the sections 7, 8 when the bushing is mounted.

In order to make the mounting of the sections 7, 8 possible, at least one flange 10 is separate before the mounting, and in order also to make the dismounting of the bushing possible, the flange 10 is suitably disconnectably connected to the cage element 3. Also, other fixing means than flanges are thinkable for the axial fixing of the sections 7, 8.

Since all sections 7, 8 are to be kept together to a closed ring, the cross sections of the grooves and the ridges have such a form, that the sections cannot be separated without material deformation by mutual displacement sideways. As shown in FIG. 1, the cross sections therefore suitably have an undercut shape. A ring which is put together by such sections is inherently kept together and since it surrounds the other parts of the bushing, a bushing unit is created which constitutes one piece, which simplifies the handling of the bushing. The bushing is also built up by a number of simple details, which are easy and cheap to produce and easy to mount, which means that the bushing can be produced at low cost. It is thus possible to produce the cage element 3 by, for example, casting, and to produce the sections 7, 8 by extrusion. The mounting of the bushing can, for example, be carried out by uniting sections 7, 8 to a closed sleeve, which is pushed over the cage element 3, thereby only partly covering the ball paths. Thereafter, the balls are filled through the free portions of the ball paths, and the sleeve is then pushed into its final position, whereafter it is locked by fitting the flange 10.

Also, other embodiments of the bushing than the above-described are thinkable within the limit of the claims. For example, sections 8 can be fixed to the cage element 3, suitably at the flange 9. In this case, the mounting can take place by pushing the sections 7 partly between sections 8, whereafter the balls are filled. Then, the sections 7 are completely pushed into position, and the flange 10 is fitted for fixing the sections.

I claim:

1. A ball bushing for linear motions comprising a circumferentially extending cage member disposed between an outer sleeve and a shaft or the like, means defining a plurality of circumferentially spaced, axially extending grooves in said cage defining closed paths for rolling elements and including at least one path portion wherein the rolling elements are loaded, a radial projection at one axial end of said cage defining an abutment shoulder for said sleeve, said sleeve comprising a plurality of longitudinal sections of predetermined generally equal length interengagable to form an annular member circumscribing the grooves in said cage, adjacent side edges of each section having a complementary close fitting grooves and ridges formed therein permitting assembly of the sections to form the annular member by relative axial displacement, detachable retaining means adjacent the opposite end of the cage adapted to confront one end of the sleeve opposite said radial projection thereby limiting axial displacement relative to the cage.

2. A ball bushing according to claim 1, characterized by that the loaded portions of the outer ring consist of sections of metal, and that the unloaded portions consist of sections of a polymer material.

3. A ball bushing according to claim 1, characterized by that those sections which constitute the loaded portions of the outer ring are provided with ridges along their sides, and that the sections which constitute its unloaded portions are provided with grooves along their sides.

4. A ball bushing according to claim 1, characterized by that its end portions comprise parts which are connected to a cage element inside the outer sleeve, the sections being fixed in the bushing by said parts.

5. A ball bushing according to claim 4, characterized by that at least one of the parts consists of a flange which before the mounting of the bushing is a separate piece.

6. A ball bushing as claimed in claim 1 wherein said radial projection is detachably mounted at least at one axial end of said cage.

7. A ball busing as claimed in claim 1 wherein the sections constituting the unloaded bushings are of a variable cross section, the central part being comparatively thin and thereby resilient permitting prestressing of the bushing.

8. A ball bushing as claimed in claim 1 wherein alternate sections are formed integrally with said abutment shoulder.

* * * * *